US009296288B2

(12) United States Patent
Galbraith

(10) Patent No.: US 9,296,288 B2
(45) Date of Patent: Mar. 29, 2016

(54) HYBRID RADIANT ENERGY AIRCRAFT ENGINE

(71) Applicant: Separation Design Group LLC, Waynesburg, PA (US)

(72) Inventor: Stephen Douglas Galbraith, Holbrook, PA (US)

(73) Assignee: Separation Design Group LLC, Waynesburg, PA (US)

( * ) Notice: Subject to any disclaimer, the term of this patent is extended or adjusted under 35 U.S.C. 154(b) by 369 days.

(21) Appl. No.: 13/875,449

(22) Filed: May 2, 2013

(65) Prior Publication Data

US 2014/0345281 A1 Nov. 27, 2014

Related U.S. Application Data

(60) Provisional application No. 61/643,479, filed on May 7, 2012.

(51) Int. Cl.

| | | |
|---|---|---|
| *F02K 7/10* | (2006.01) | |
| *B60K 6/24* | (2007.10) | |
| *B60K 6/28* | (2007.10) | |
| *F02K 3/06* | (2006.01) | |
| *F02K 3/062* | (2006.01) | |
| *F02C 1/00* | (2006.01) | |

(52) U.S. Cl.
CPC ... *B60K 6/24* (2013.01); *B60K 6/28* (2013.01); *F02C 1/00* (2013.01); *F02K 3/06* (2013.01); *F02K 3/062* (2013.01); *Y02T 10/6295* (2013.01)

(58) Field of Classification Search
CPC .............. B60K 6/24; B60K 6/28; F02K 7/10; F02K 13/00
USPC ............................................. 60/641.8–641.15
See application file for complete search history.

(56) References Cited

U.S. PATENT DOCUMENTS

| | | | | | |
|---|---|---|---|---|---|
| 3,161,375 | A | * | 12/1964 | Ruhge | F41G 7/001 136/291 |
| 3,504,490 | A | * | 4/1970 | Klamm | F02C 7/262 250/215 |
| 3,678,306 | A | * | 7/1972 | Garnier | F02C 7/04 310/11 |
| 4,159,624 | A | * | 7/1979 | Gruner | F02C 3/107 60/268 |
| 4,719,756 | A | * | 1/1988 | Streuli | B63J 3/00 60/597 |

(Continued)

OTHER PUBLICATIONS

Absorption, Transmittance, and Optical Density. Melles Griot publication Chapter 13: Filters. www.mellesgriot.com.

(Continued)

*Primary Examiner* — Jorge Pereiro
*Assistant Examiner* — Shafiq Mian

(57) ABSTRACT

Hybrid aircraft propulsion systems are disclosed comprising an electrically driven ducted fan, a peripheral duct or enclosure, a combustion-produced source of radiant energy, radiant energy receivers or cold mirrors, and thermophotovoltaic or thermoelectric cell energy converters. An electric motor drives a partially or completely duct enclosed fan. Downstream and within the duct enclosure, radiant energy emitters irradiated receiver fins and thermophotovoltaic cells or thermoelectric cells. The receiver fins heat and expand the fan air, and the thermophotovoltaic cells or thermoelectric cells convert the radiant energy into electrical energy which is available to charge batteries and energize the fan motor. Thrust is provided via the acceleration of air by the fan and by the acceleration of air due to heat driven expansion.

24 Claims, 7 Drawing Sheets

(56) References Cited

U.S. PATENT DOCUMENTS

| | | | | |
|---|---|---|---|---|
| 4,776,895 | A * | 10/1988 | Goldstein | 136/253 |
| 5,150,253 | A * | 9/1992 | Watanuki | 359/360 |
| 5,403,405 | A | 4/1995 | Fraas et al. | |
| 5,551,992 | A * | 9/1996 | Fraas | H01L 31/0547 136/253 |
| 5,932,885 | A * | 8/1999 | DeBellis | F23C 3/002 136/253 |
| 5,942,047 | A | 8/1999 | Fraas et al. | |
| 6,218,607 | B1 * | 4/2001 | Mulligan | H02S 10/30 136/253 |
| 6,235,983 | B1 * | 5/2001 | Becker | H02S 10/30 136/248 |
| 6,239,435 | B1 * | 5/2001 | Castleman | G08B 17/12 250/339.15 |
| 6,271,461 | B1 * | 8/2001 | Fraas et al. | 136/253 |
| 6,284,969 | B1 * | 9/2001 | Fraas | H02S 10/30 136/253 |
| 6,489,553 | B1 | 12/2002 | Fraas et al. | |
| 7,196,263 | B2 * | 3/2007 | Fraas | F23C 3/002 136/244 |
| 7,325,593 | B2 * | 2/2008 | Kujirai | F28F 3/02 165/133 |
| 7,602,096 | B2 * | 10/2009 | Muldoon | F02K 7/00 310/267 |
| 7,718,887 | B2 * | 5/2010 | Hulen | B60L 5/005 136/205 |
| 8,025,822 | B2 * | 9/2011 | Miyao | G02B 3/0031 264/1.7 |
| 8,205,822 | B1 * | 6/2012 | Jameson et al. | 244/17.11 |
| 8,420,926 | B1 * | 4/2013 | Reedy | H01L 31/052 136/248 |
| 8,581,090 | B1 | 11/2013 | Fraas | |
| 2002/0148498 | A1 * | 10/2002 | Nakayama | H02S 10/30 136/253 |
| 2006/0042252 | A1 * | 3/2006 | Derouineau | F02C 9/26 60/703 |
| 2006/0242962 | A1 * | 11/2006 | Johnson | F01D 15/10 60/761 |
| 2006/0260323 | A1 * | 11/2006 | Moulebhar | F01D 21/003 60/793 |
| 2007/0101721 | A1 * | 5/2007 | Dooley | F01D 15/10 60/721 |
| 2007/0126292 | A1 * | 6/2007 | Lugg | F01D 5/03 310/11 |
| 2008/0061559 | A1 * | 3/2008 | Hirshberg | F03D 3/0454 290/55 |
| 2010/0115947 | A1 * | 5/2010 | Galbraith | F03G 6/00 60/643 |
| 2010/0327109 | A1 * | 12/2010 | Dooley | F01D 15/10 244/50 |
| 2011/0100014 | A1 * | 5/2011 | Hyde et al. | 60/767 |
| 2011/0108663 | A1 * | 5/2011 | Westenberger | B64D 27/02 244/60 |
| 2011/0314835 | A1 * | 12/2011 | Liu | F02C 6/08 60/782 |
| 2012/0247847 | A1 * | 10/2012 | Schroeder | H01L 35/00 180/65.31 |

OTHER PUBLICATIONS

Andersson, Klas. Fundamental oxy-fuel combustion research carried out within the ENCAP project. Paper delivered at the Oxy-fuel workshop, Cottbus, Germany, Nov. 29 & 30, 2005.

Bermel, Peter et al. Design and global optimization of high-efficiency thermophotovoltaic systems. Optics Express A314, Sep. 13, 2010 / vol. 18, No. S3.

Chan, Walker. Towards a High-Efficiency Micro-Thermophotovoltaic Generator. Jun. 2010. Master's Thesis submitted to Dept of Electrical Engineering and Computer Science, MIT.

Cockeram, B.V. and J.L. Hollenbeck. The spectral emittance and stability of coatings and textured surfaces for thermophotovoltaic (TPV) radiator applications. USDOE contract No. DE-AC11-98PN38206, Bettis Atomic Power Laboratory. Jul. 1999.

Crase, Bob. High-performance optical coatings: tough requirements make for tough coatings. Laser Focus World, Nov. 23, 2009. www.laserfocusworld.com.

DC Ring Motor Powers 600-lb. Thrust Ducted-Fan, ThinGap LLC press release, Apr. 20, 2010. Originally at http://www.thingap.com/pdf/tg14010ds.pdf no longer available.

Doeliner, O.L. Radiant Energy Power Source for Jet Aircraft, Final performance report of grant DE-FG01-86CE-15301, OSTI identifier: 10125870, submitted Feb. 1992, published Dec. 13, 2009. http://www.osti.gov/scitech/servlets/purl/10125870.

F/Lt. Beeton, A.B.P. The Increase in Thrust Obtainable from a Power Plant Installation using the Cooling-air as a Propulsive Jet. Reports and Memoranda No. 2147, A.R.C. Technical Report. May 1945.

FAA Aerospace Forecast, Fiscal Years 2011-2031. U.S. Department of Transportation, Federal Aviation Administration, Aviation Policy and Plans. 2011.

Fan, Shanhui, et al., Ultra high efficiency thermo-photovoltaic solar cells using metallic photonic crystals as intermediate absorber and emitter. Global Climate a& Energy Project, Stanford University, 2012. Document found here: http://gcep.stanford.edu/pdfs/PE5v0XtfTasff29ZflqL4Q/2.2.2_Fan_Public_Version_2012.pdf; Blog: http://www.stanford.edu/group/gcep/cgi-bin/gcep-research/all/ultra-high-efficiency-thermophotovoltaic-solar-cells-using-metallic-photonic-crystals-as-intermediate-absorber-and-emitter-2/.

Fleming, James G. et al. 3D active photonic crystal devices for integrated photonics and silicon photonics. Sandia Report SAND2005-6824. Sandia National Laboratiries, Albuquerque NM. 2005.

Hanus, Daniel, R. Theiner & E. Ritschl. Ultra and very light ducted fan propulsion system complex design optimization. Paper presented at the 24th International Congress of the Aeronautical Sciences (ICAS), 2004.

Lior, David. Recuperator design for 90kw turboprop/turboshaft. 9th Israeli Sumposium on Jet Engines and Gas Turbines, Technion, Haifa, Jul. 10, 2010. Article updated on Scribd Mar. 27, 2013. Available at: http://www.scribd.com/doc/79578102/5-tor-Design-for-90KW-Turbo-Shaft-RJet-Engineering-Israel and: http://jet-engine-lab.technion.ac.il/9aijes/5.%20Recuperator%20Design%20for%2090KW%20Turboprop,Turbo shaft,%20RJet%20Engineering,%20Israel.pdf.

Long, Geoff (Senior systems engineer, LaunchPoint Technoligies). A high power density, high efficiency axial flux Halbach array motor/generator. Presented to the Electric Aircraft Symposium Apr. 23, 2010. Found online as pdf.

Mwamburi, Mghendi, Ewa. Wackelfard & Bjorn. Karlsson. Optical properties of SNOx:F/Al2O3/Al solar selective reflector surfaces. Proc. Eurosun 2000, Copenhagen, Denmark, Jun. 19-23, 2000.

NASA—Safeguarding Our Atmosphere, FS-2000-04010-GRC. NASA Glenn Research Center, Cleveland OH. http://www.nasa.gov/centers/glenn/about/fs10grc.html.

Omatete, O.O., et al. Assessment of recuperator materials for microturbines. Metals and Ceramics Division, Oak Ridge National Laboratory. ORNL/TM-2000/304. Dec. 2000.

Poul, R and D. Hanus. Composite Axial Flow Propulsor for Small Aircraft. Acta Polytechnica vol. 45, No. 4. 2005. Czech Technical University in Prague.

Riggins D. (2003) The Thermodynamic Continuum of Jet Engine Performance: The Principle of Lost Work due to Irreversibility in Aerospace Systems. Int. J. Thermodynamics, 6(3): 107-120.

Stank, A.M. Gaseous and Particulate Emissions with Jet Engine Exhaust and Atmospheric Pollution. Advances on Propulsion Technology for High-Speed Aircraft (pp. 15-1-15-22. Educational Notes RTO-EN-AVT-150) Neuilly-sur-Seine, France: RTO 2008. Available at: http://ftp.rta.nato.int/public/PubFullText/RTO/EN/RTO-EN-AVT-150/EN-AVT-150-15.pdf.

* cited by examiner

HYBRID RADIANT ENERGY AIRCRAFT ENGINE

CROSS-REFERENCE TO RELATED APPLICATIONS

This application claims the benefit of U.S. Provisional Application No. 61/643,479, filed May 7, 2012, the entirety of which is incorporated herein by reference.

FIELD OF THE INVENTION

The invention relates to aircraft engines capable of being operated by electricity and by the combustion of a liquid, gaseous, or solid fuel.

BACKGROUND OF THE INVENTION

Conventional aircraft engines utilize reciprocating engines, turbine driven propeller engines, or turbine engines which deliver thrust as a result of a combination of fan action and jet thrust. Reciprocating engines require very high maintenance and turbine engines are very expensive to manufacture because of the exotic materials used in the hot section of the engine. Reciprocating and turbine engines rely entirely on the combustion of a chemical fuel for their operation.

Recently, because of advances in electric motor technology and battery energy density, short range small aircraft have been developed that are quiet, non polluting, and have ultra low maintenance requirements. These aircraft, however, have very short flight range because the energy density of lithium ion batteries is only about 190 watt hours per kilogram. Hydrocarbon fuels have energy densities in the range of 12,000 watt hours per kilogram. So it is obvious that even with advances in battery energy density, electrically operated aircraft will have limited distance capabilities.

It is, therefore, desirable to retain the beneficial operating characteristics of the electric propulsion system while increasing range.

SUMMARY OF THE INVENTION

Hybrid aircraft propulsion systems are disclosed comprising an electrically driven ducted fan, a peripheral duct or enclosure, a combustion-produced source of radiant energy, radiant energy receivers or cold mirrors, and thermophotovoltaic or thermoelectric cell energy converters. An electric motor drives a partially or completely duct enclosed fan. Downstream and within the duct enclosure, radiant energy emitters irradiate receiver fins and thermophotovoltaic cells or thermoelectric cells. The receiver fins heat and expand the fan air, and the thermophotovoltaic cells or thermoelectric cells convert the radiant energy into electrical energy which is available to charge batteries and energize the fan motor. Thrust is provided via the acceleration of air by the fan and by the acceleration of air due to heat driven expansion.

In certain embodiments, hybrid radiant energy aircraft engines, comprises:
  an electric motor driven tubeaxial fan;
  a peripheral duct enclosing the operating components;
  an electric motor to drive said fan;
  at least one combustion driven source of radiant energy;
  radiant energy receiving fins located downstream said fan and located with their major dimensions parallel to the airflow;
  optional cold mirrors; and
  thermophotovoltaic cells or thermoelectric cells positioned to receive a portion of the radiant energy;
  wherein the radiant energy radiators are configured to deliver energy to the receiving fins and the photovoltaic cells;
  wherein the tubeaxial fan directs air past the receiver fins;
  wherein the receiver fins heat the downstream fan air and expand it or increase its pressure;
  wherein optional preheating of the combustion air is provided via heat exchangers;
  wherein the thermophotovoltaic cells or thermoelectric cells convert a portion of the radiant energy into electrical energy;
  wherein that electrical energy is available to power the fan motor and to charge batteries and for other auxiliary uses; and
  wherein the thrust produced is the result of any combination of acceleration of air due to fan action and expansion of the fan air due to heating.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Definitions

Figure 1:
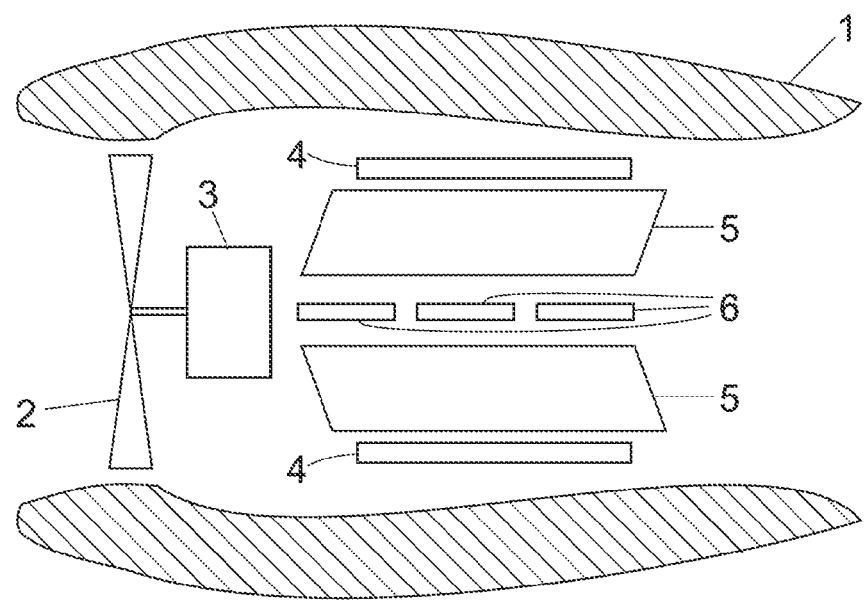
FIG. 1 is a cross section of one embodiment of the engine of the invention.

The following definitions are provided for the full understanding of terms used in this specification.

As used herein, the article "a" means "at least one," unless the context in which the article is used clearly indicates otherwise.

As used herein, "thermophotovoltaic cell" means any material capable of converting radiant energy into electricity. These cells are sometimes referred to as photovoltaic cells or concentrator photovoltaic cells.

As used herein, "thermoelectric cell" means any material capable of converting a temperature differential directly into electricity.

As used herein, "duct" means a housing having a basically cylindrical shape, having a hollow center section, having mounting tabs for internal components, and having contours that promote the acceleration of the fan and heated air, and having structural components that allow attachment to the aircraft and transmission of thrust forces.

As used herein, "cold mirrors" means a material that reflects short wave radiation and absorbs or is transparent to long wave radiation.

As used herein, "optical window" means a transparent covering that prevents the convective cooling of the radiator surface that must be maintained at a specific temperature to be an effective radiator. An example of an optical window would be a silica glass cylindrical element that would house a smaller diameter emitter, and would possibly be evacuated to reduce heat losses and to prevent oxidation of the emitter surface. A portion of the window could be reflective to direct the radiant energy in a certain direction. Alternatively, the optical window could be a flat or curved cover.

As used herein, "radiant energy radiator" means an element that supports combustion of a fuel and air or oxygen either internally or at its surface, and that has materials of construction that promote the emission of radiation, preferably at frequencies tuned to the photovoltaic cells.

As used herein, "tubeaxial fan" means a fan or propeller connected to a motor and positioned in a duct so that the airflow is parallel to the axis of rotation of the fan and inside the duct.

As used herein, "hybrid" means to employ more that one means of producing a propulsive force. In the case of the invention, this is; employing electric motor driven fan means and air heating means, and also photovoltaic or photoelectric means for operation of the electric motor.

The present invention teaches the construction and operation of a combined cycle aircraft engine. The engine uses a high efficiency, lightweight electric motor to drive a multi-bladed tubeaxial fan. The fan is located at the forward section of a peripheral duct. Rearward of the fan are radiant energy radiators that achieve radiance via the combustion of a chemical fuel. The radiators deliver energy to longitudinally located fins that absorb the longer wave radiation, convert it to heat, and conduct that heat energy to the airflow created by the axial fan. The heated air expands and is accelerated rearward producing thrust. The fins may have hollow portions that intercept part of the fan air, preheat it and deliver it to the combustors. In this sense the engine operates as an ultra-low compression ratio Brayton cycle engine. Unlike the normal Brayton cycle engine, the fan power is supplied via an electric motor.

Within the duct, and also located in a longitudinal fashion, are thermophotovoltaic cells or thermoelectric cells. These cells convert a wide spectrum of radiated energy into electricity at an efficiency of as much as 41%. This electrical energy is directed to the fan motor and to the battery when appropriate. The engine is highly efficient because the radiant energy is utilized as heat to expand air, and as directly converted photon to electrical energy. Also, as with hybrid ground vehicles, the battery stored energy and the chemically stored energy can be used when conditions require high output, or the engine can operate on battery power when demand is lower or pollution or noise abatement is required. The power density of radiant combustors and thermophotovoltaic cells or thermoelectric cells is greater than 20 watt per centimeter square area (see Spectrolab) so sufficient energy can be generated and converted within a 60 cm diameter by 100 cm long duct to create 78,000 watts of electrical energy continuously while also injecting an equal amount of energy into heat for the acceleration of air.

So it can be seen that an engine with only two bearings in the electric motor and no hot end moving parts can be constructed using existing components. The engine is suitable for use in small aircraft and for the propulsion of drones. The engine can operate quietly and in an electric only mode and with range extending capabilities in the radiant energy and electric mode. The electric fan can be entirely enclosed within the peripheral duct, or the fan blade may extend beyond the duct circumference for lower speed, quieter operation.

Figure 4:
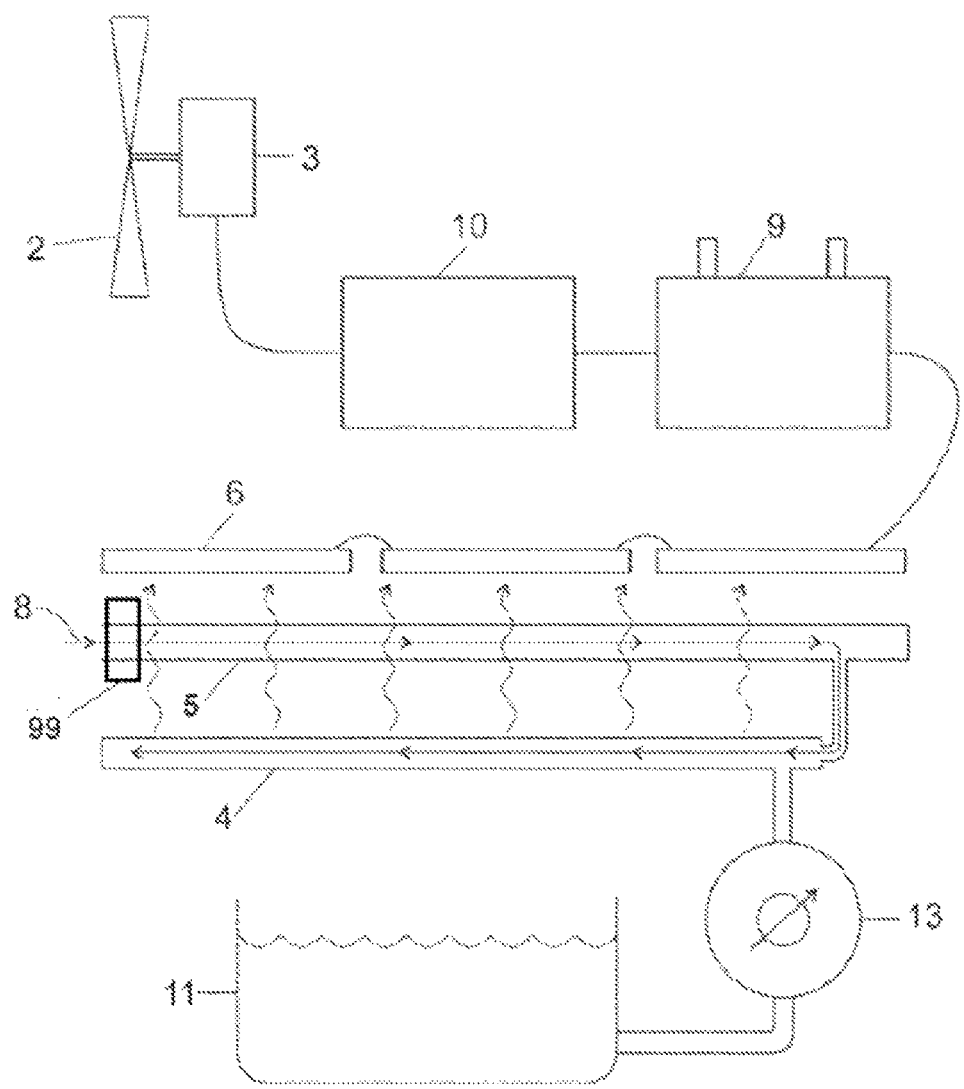
FIG. 4 is a block diagram of the functional components of a typical propulsion system using of one embodiment of the engine of the invention.

In one embodiment, the invention is directed to hybrid radiant energy aircraft engines, comprising:
an electric motor driven tubeaxial fan;
a peripheral duct enclosing the operating components;
an electric motor to drive said fan;
at least one combustion driven source of radiant energy;
radiant energy receiving fins located downstream said fan and located with their major dimensions parallel to the airflow;
optional cold minors; and
thermophotovoltaic cells or thermoelectric cells positioned to receive a portion of the radiant energy;
wherein the radiant energy radiators are configured to deliver energy to the receiving fins and the photovoltaic cells;
wherein the tubeaxial fan directs air past the receiver fins, wherein the receiver fins heat the downstream fan air and expand it or increase its pressure;
wherein optional preheating of the combustion air is provided via heat exchangers (99), as shown in FIG. 4, described herein;
wherein the thermophotovoltaic cells or thermoelectric cells convert a portion of the radiant energy into electrical energy;
wherein that electrical energy is available to power the fan motor and to charge batteries and for other auxiliary uses; and wherein the thrust produced is the result of any combination of acceleration of air due to fan action and expansion of the fan air due to heating.

FIG. 1 is a cross section of one embodiment of the engine showing the external shroud (1), the fan (2), the fan electric motor (3), the radiant energy combustors (4), the heat absorbing fins (5), and the thermophotovoltaic cells or thermoelectric cells (6). The intake of the engine is to the left and the exhaust to the right.

Figure 2:
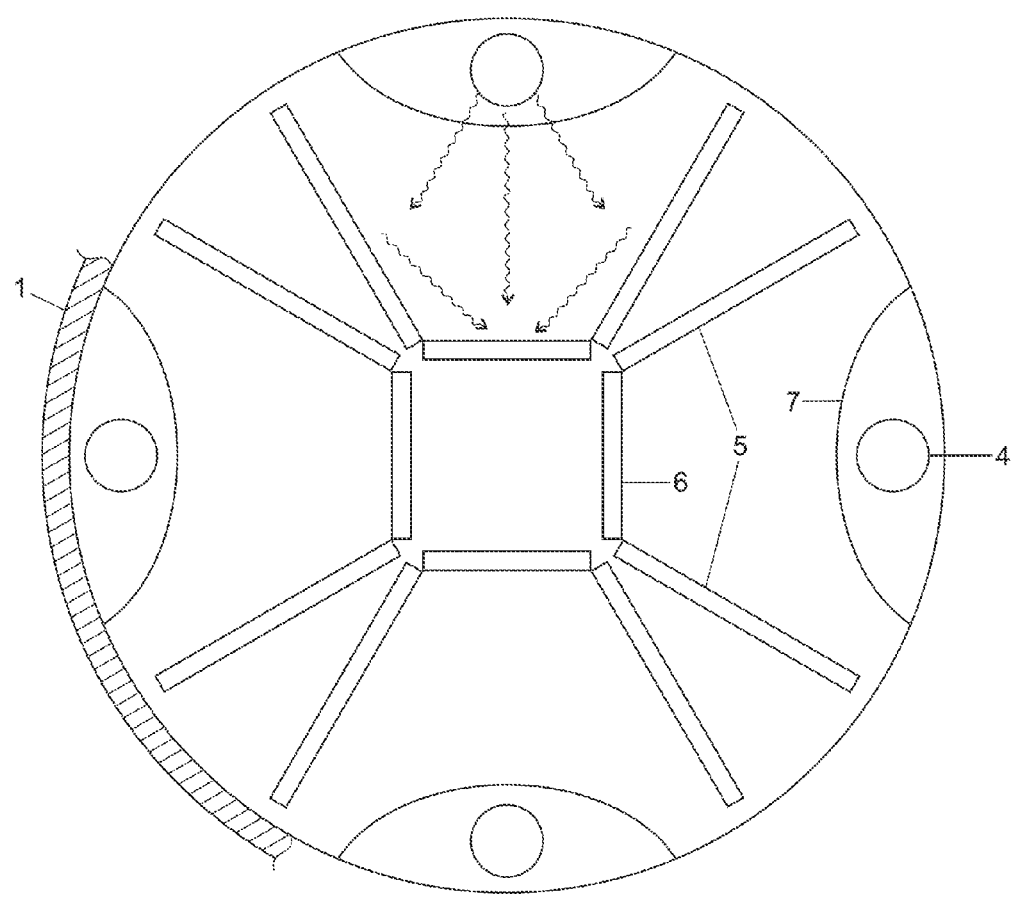
FIG. 2 is a frontal view of one embodiment of the engine of the invention with the fan and fan motor not shown.

FIG. 2 is a frontal view of one embodiment of the engine of the invention with the fan and fan motor not shown. In this drawing the radiant energy radiators (4) are protected by transparent shields (7) that keep the airflow from lowering the temperature of the radiators surfaces. The absorber fins may also be cold mirrors which reflect and focus the short wave radiation onto the thermophotovoltaic cells or thermoelectric cells, while absorbing the longer wave radiation and conducting heat to the air passing by. The direction of the radiant energy and the reflected radiant energy is shown by the arrows.

Figure 3:
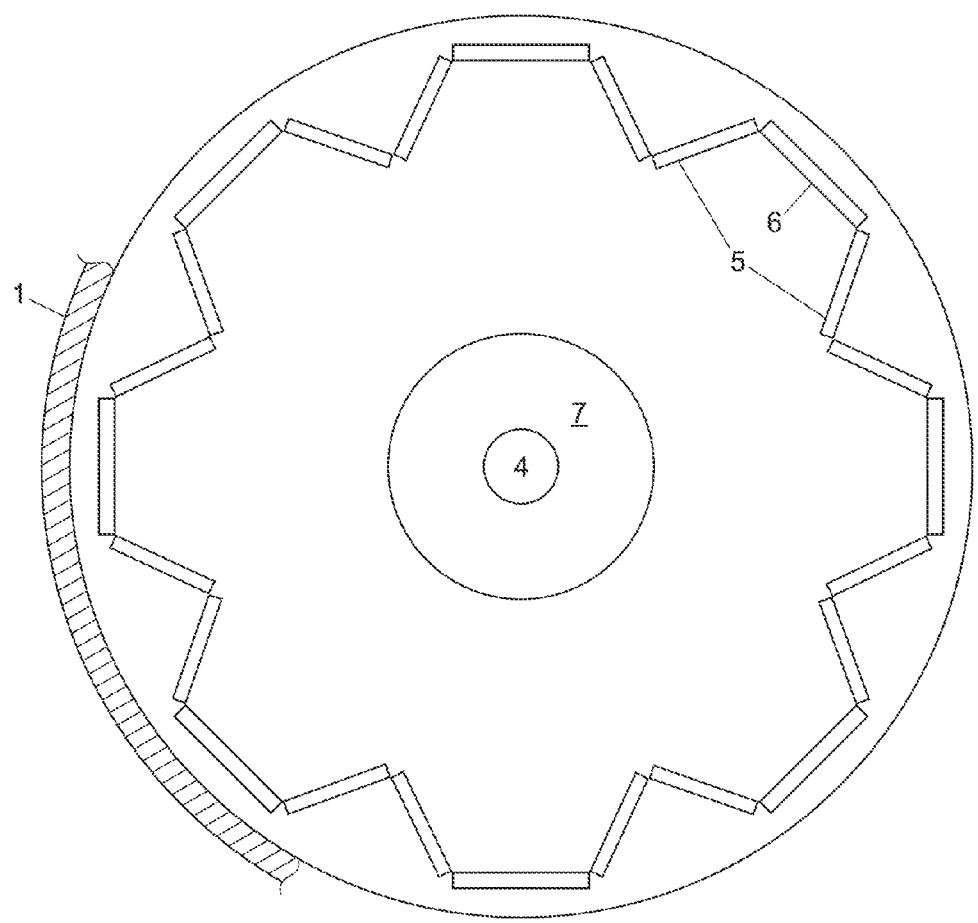
FIG. 3 is a frontal view of one embodiment of the engine of the invention with the fan and fan motor not shown.

FIG. 3 is a frontal view of one embodiment of the engine of the invention with the fan and fan motor not shown. In this drawing the radiator is located in the central part of the duct, while the thermophotovoltaic cells or thermoelectric cells are located on the internal circumference of the duct. This arrangement provides for a simpler shielding of the radiator.

FIG. 4 is a block diagram of the functional components of a typical propulsion system using of one embodiment of the engine of the invention. A battery (9) stores electrical energy, a controller (10) regulates the electrical energy going to the fan motor, and a vessel (11) stores chemical energy fuel for the radiant energy combustors. A pneumatic pathway is shown (8) wherein air enters a hollow space in fin (5) and is pre heated and sent to combustor (4). Wavy arrows indicate direction of the radiant energy from the combustors toward the thermoelectric cells (6). A regulator (13) controls the flow of fuel to the combustor(s).

Figure 5:
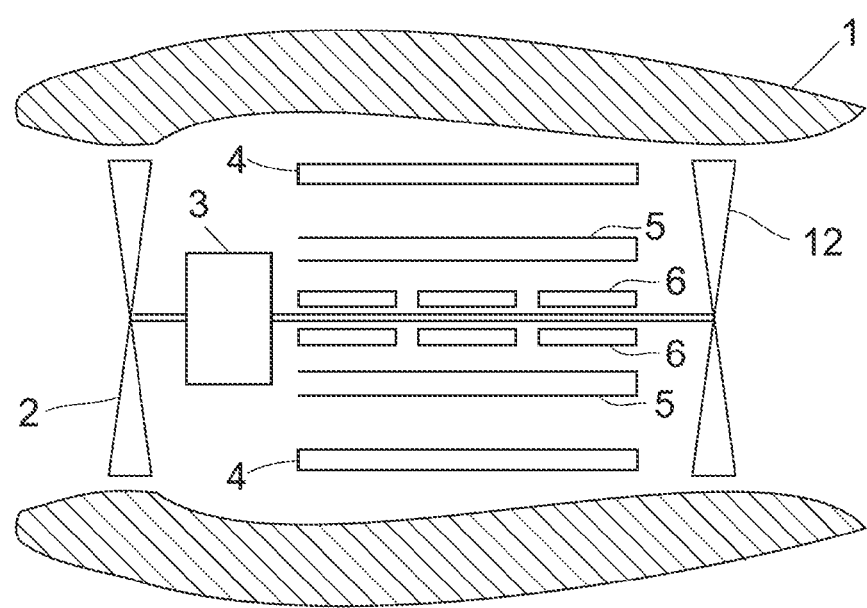
FIG. 5 is a cross section similar to FIG. 1 of one embodiment of the engine of the invention.

FIG. 5 is a cross section similar to FIG. 1 of one embodiment of the engine of the invention but with the addition of a turbine stage which intercepts the accelerated air before it exits the duct. The turbine disc (12) is connected to the inlet fan and assists the electric fan motor action. In this mode of operation, the engine could function even after complete electrical failure.

Figure 6:
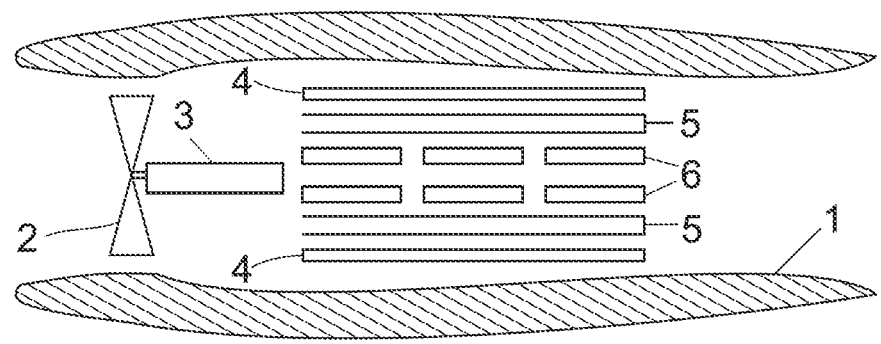
FIGS. 6 and 7 show two iterations of one embodiment of the engine of the invention.

FIG. 6 shows one embodiment of the engine of the invention utilizing a small frontal section engine that would operate in a high speed environment.

Figure 7:
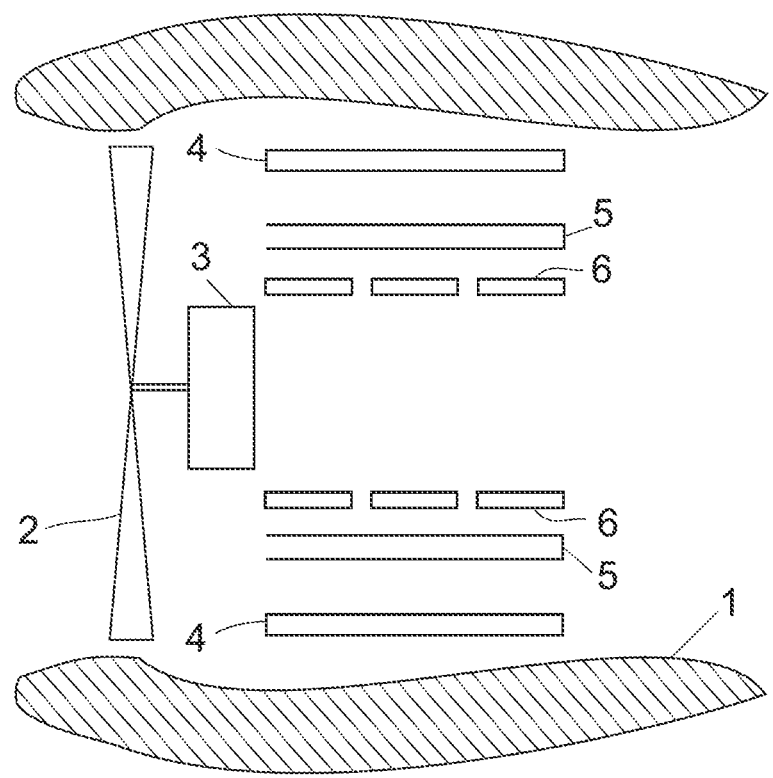

FIG. 7 shows an embodiment of the engine of the invention with a large frontal section engine having a short length and being designed for lower speed operation at high efficiency.

Figure 8:
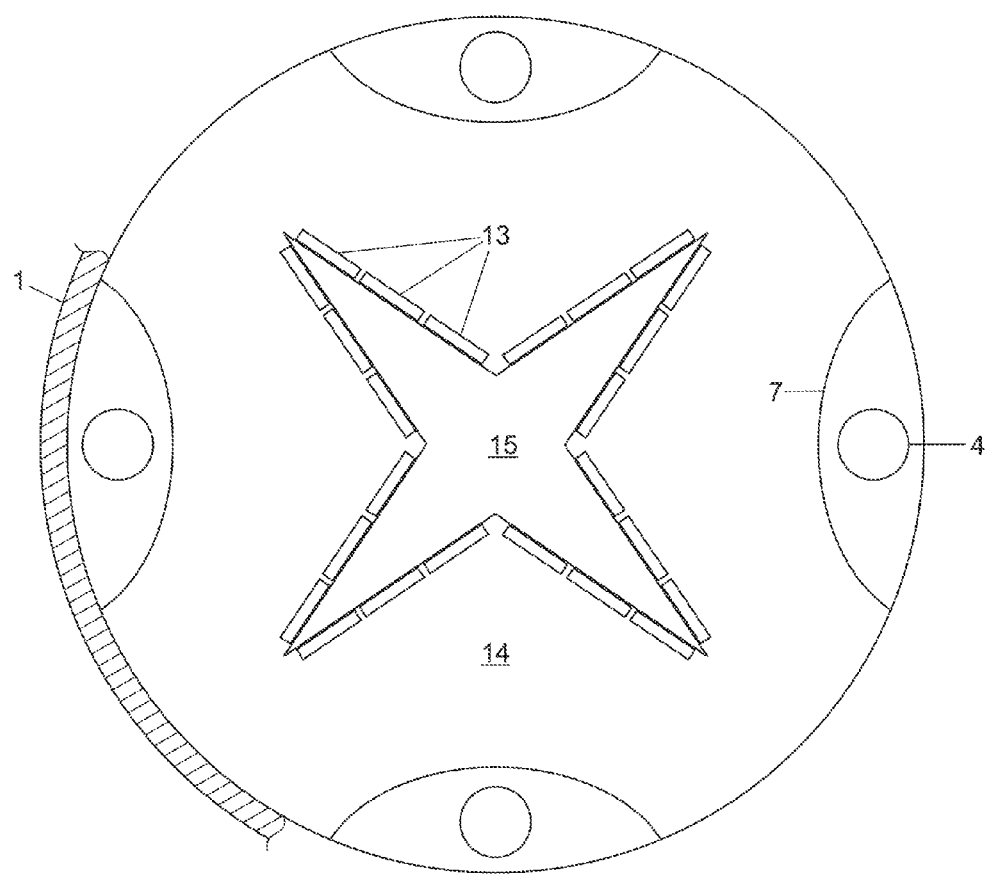
FIG. 8 is a cross section of one embodiment of the invention, similar to FIG. 1.

FIG. 8 is a cross section similar to FIG. 1 of one embodiment of the engine of the invention utilizing thermoelectric cells (13) convert radiant energy into heat and then into electricity. The thermoelectric cells receive energy at the hot side (14), and reject heat at the cold side (15).

In certain embodiments, the hybrid radiant energy aircraft engine of the invention further comprises duct parallel fins configured to absorb long wave radiation and to reflect and optionally to focus shortwave radiation toward the thermophotovoltaic cells or thermoelectric cells.

In certain embodiments, the hybrid radiant energy aircraft engine of the invention further comprises a peripheral generally cylindrical housing, internally shaped to convert heated fan air into thrust.

In certain embodiments, the hybrid radiant energy aircraft engine of the invention further comprises optical windows or mechanical shrouds configured to prevent cooling of the radiant energy radiator surfaces.

In certain embodiments, the hybrid radiant energy aircraft engine of the invention further comprises at least one radiant energy radiator located on the inner surface of the peripheral housing.

In certain embodiments, the hybrid radiant energy aircraft engine of the invention further comprises at least one radiant energy radiator located in the center area of the peripheral housing.

In certain embodiments, the hybrid radiant energy aircraft engine of the invention further comprises an electronic control means for regulation of fan motor energy input.

In certain embodiments, the hybrid radiant energy aircraft engine of the invention further comprises a control means for regulation of the energy output of the radiant energy radiators.

In certain embodiments, the hybrid radiant energy aircraft engine of the invention further comprises an electrical energy storage device located within or on the aircraft that provides electrical energy to the fan motor and which receives electrical energy from the thermophotovoltaic cells or thermoelectric cells. In certain embodiments, the electrical storage device comprises at least one lithium ion battery. In certain embodiments, the electrical storage device comprises an electrochemical storage device. In certain embodiments, the electrical storage device comprises a flow battery. In certain embodiments, the electrical storage device comprises a capacitor or pseudocapacitor. In certain embodiments, the electrical storage device is an electrochemical conversion device, such as a fuel cell.

In certain embodiments, the hybrid radiant energy aircraft engine of the invention further comprises multiple radiant energy radiators that can be activated and deactivated separately or in groups. In certain embodiments, the amount of thrust produced is in part controlled by the number of radiators that are activated. In certain embodiments, oxides of nitrogen and unburned hydrocarbon emissions are limited by operating each radiator only at its optimum temperature and air fuel ratio.

In certain embodiments, the hybrid radiant energy aircraft engine of the invention further comprises a liquid, gaseous, or solid combustion fuel storage device located within or on the aircraft provides chemical energy to the radiant energy combustors.

In certain embodiments, the hybrid radiant energy aircraft engine of the invention, the ratio of energy provided to the fan motor compared to the energy provided to the radiant energy radiators is selected to best match engine performance and energy availability to flight conditions and flight plans. In certain embodiments, the energy ratios are preset for at least one of takeoff, climb, cruise, altitude change, landing operations, and combinations thereof. In certain embodiments, the energy ratios are selected by an electronically stored algorithm that has as an input the throttle setting.

In certain embodiments, the energy ratios are selected in response to a computational analysis of the flight plan, energy storage capacity, and other relevant data.

In certain embodiments, a single stage axial rotating turbine element located toward the exit end of the engine converts some of the kinetic energy of the exhaust air into shaft power which mechanically assists the fan motor or operates a generator.

When ranges are used herein for physical properties, such as molecular weight, or chemical properties, such as chemical formulae, all combinations, and subcombinations of ranges specific embodiments therein are intended to be included.

The disclosures of each patent, patent application and publication cited or described in this document are hereby incorporated herein by reference, in its entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed is:

1. A combined cycle aircraft engine, comprising:
a shroud having an interior surface, the interior surface defining a bore extending through the shroud, and the shroud having a longitudinal axis, an intake portion, and an exhaust portion;
a tubeaxial fan assembly at least partially positioned within the intake portion of the shroud with respect to the shroud longitudinal axis and, in operation, generating an airflow that is directed towards the exhaust portion of the shroud and substantially parallel to the shroud longitudinal axis, wherein the tubeaxial fan assembly comprises an electric motor operatively associated with an electrical power source located outside the shroud and a fan driven by the electric motor;
a plurality of heat absorbing fins located between the tubeaxial fan and the exhaust portion of the shroud relative to the shroud longitudinal axis, each of the fins having a longest dimension parallel to the shroud longitudinal axis and, the each of the fins reflect and conduct heat to passing by air, wherein each of the fins defines a duct to receive at least a portion of the airflow produced by the tubeaxial fan;
at least one radiant energy radiator located between the tubeaxial fan and the exhaust portion of the shroud relative to the shroud longitudinal axis and comprising at least one combustor defining a combustion chamber, wherein the combustion chamber is in fluidic communication with a vessel located outside the shroud that is configured to receive a chemical energy fuel, wherein the at least one combustion chamber is in fluidic communication with at least one of the plurality of heat absorbing fins, wherein, in operation, the pre-heated airflow passes into the at least one combustion chamber and undergoes combustion to produce radiant energy comprising short wave radiation, long wave radiation and heat; and at least one conversion cell positioned to receive at least a portion of the radiant energy and convert at least a portion of the received portion of the radiant energy into electrical energy, wherein the at least one conversion cell is operably coupled to both of the electrical motor and the electrical power source of the tubeaxial fan assembly such that the electrical energy produced therein is at least one of stored in the electrical power source and used to power at least the fan of the tubeaxial fan assembly via the electric motor;

wherein, in operation, each of the plurality of heat absorbing fins is positioned relative to the at least one radiant energy radiator and adapted to absorb at least a portion of the long wave radiation produced by the at least one radiant energy radiator, the each of the fins convert the long wave radiation to heat, and conduct the heat to the airflow generated by the tubeaxial fan assembly, to at least one of expand and increase the pressure of the airflow, thereby producing thrust to assist in propelling an aircraft, wherein said aircraft engine is positioned either in or on said aircraft.

2. The engine of claim 1, further comprising a heat exchanger configured to pre-heat the portion of the airflow within the duct of at least one heat absorbing fin of the plurality of heat absorbing fins.

3. The engine of claim 1, wherein each of the plurality of heat absorbing fins further comprises a cold mirror material.

4. The engine of claim 1, further comprising at least one optical window positioned over and isolating each of the at least one radiant energy radiators from the airflow.

5. The engine of claim 1, wherein the at least one radiant energy radiator is positioned on the interior surface of the shroud.

6. The engine of claim 1, wherein the shroud has a central portion positioned between the intake portion and the exhaust portion of the shroud, and wherein the at least one radiant energy radiator is positioned at the central portion of the shroud.

7. The engine of claim 1, wherein the tubeaxial fan further comprises a controller operable to regulate electrical power from the electrical power source to the electric motor.

8. The engine of claim 1, wherein the at least one radiant energy radiator further comprises a regulator positioned between and in fluidic communication with the combustor and the vessel, wherein the regulator is adapted to control the flow of chemical energy fuel to the at least one combustor.

9. The engine of claim 1, wherein the at least one radiant energy radiator comprises a plurality of radiant energy radiators.

10. The engine of claim 1, further comprising a turbine and a shaft, the turbine being positioned in the exhaust portion of the shroud and operably coupled with the shroud and coupled to the fan via the shaft, wherein the turbine is operable to convert kinetic energy of the airflow passing through the exhaust portion into mechanical energy.

11. The engine of claim 1, wherein at least one of the at least one conversion cell is a thermoelectric cell.

12. The engine of claim 1, wherein at least one of the at least one conversion cell is a thermophotovoltaic cell.

13. The engine of claim 2, wherein the combustor produces combustion exhaust gasses, and wherein the heat exchanger preheats the combustion air.

14. The engine of claim 3, wherein each of the plurality of heat absorbing fins is oriented and configured to reflect shortwave radiation produced by the at least one radiant energy radiator toward the at least one conversion cell.

15. The engine of claim 14, wherein each of the plurality of heat absorbing fins is further oriented and configured to focus the reflected shortwave radiation.

16. The engine of claim 4, wherein the at least one optical window comprises silica glass.

17. The engine of claim 5, wherein the at least one radiant energy radiator comprises a plurality of radiant energy radiators and wherein the plurality of radiant energy radiators are circumferentially spaced about the interior surface.

18. The engine of claim 9, wherein each of the plurality of radiant energy radiators can be independently selectively activated and deactivated.

19. The engine of claim 9, wherein each of the plurality of radiant energy radiators has an optimum temperature and an optimum air to fuel ratio.

20. The engine of claim 18, wherein the amount of thrust produced by the engine is at least partially controlled by the number of the plurality of radiant energy radiators that are activated at a given time.

21. The engine of claim 19, wherein each of the plurality of radiant energy radiators are limited to operation at their respective optimum temperatures and optimum air to fuel ratios to limit emissions comprising oxides of nitrogen and unburned hydrocarbons.

22. The engine of claim 10, wherein the shaft is operatively coupled to the electrical motor and wherein the mechanical energy generated by the turbine is transmitted via the shaft to the electrical motor.

23. The engine of claim 10, wherein the engine further comprises a generator, wherein the shaft is operatively coupled to the generator, and wherein the mechanical energy is transmitted via the shaft to the generator.

24. The engine of claim 10 wherein the turbine is a single stage turbine element that rotates about the shroud longitudinal axis.

* * * * *